United States Patent [19]

Weissman

[11] Patent Number: 6,032,134

[45] Date of Patent: Feb. 29, 2000

[54] CREDIT CARD BILLING SYSTEM FOR IDENTIFYING EXPENDITURES ON A CREDIT CARD ACCOUNT

[76] Inventor: Steven I. Weissman, 10762 Denver Dr., Cooper City, Fla. 33026

[21] Appl. No.: 09/195,132

[22] Filed: Nov. 18, 1998

[51] Int. Cl.[7] .................................................... G06F 17/60
[52] U.S. Cl. ................................ 705/40; 705/16; 705/17; 705/35; 705/39
[58] Field of Search ................................ 705/16, 17, 18, 705/35, 39, 26, 42, 40

[56] References Cited

U.S. PATENT DOCUMENTS

| | | | |
|---|---|---|---|
| 4,852,000 | 7/1989 | Webb et al. | 705/30 |
| 5,466,919 | 11/1995 | Hovakimian | 705/17 |
| 5,559,313 | 9/1996 | Claus et al. | 705/30 |
| 5,787,373 | 7/1998 | Migues et al. | 701/33 |
| 5,842,185 | 11/1998 | Chancey et al. | 705/40 |
| 5,864,830 | 1/1999 | Armetta et al. . | |

OTHER PUBLICATIONS

Smith, Randall, "Merrill's Once Revolutionary CMA is Losing its Edge", Wall Street Journal, p. C1, Jan. 7, 1993.
O'Sullivan, Orla, "Getting a Grip on Your Money", ABA Banking Journal, vol. 89, No. 2, Feb. 1997.
McMurray, Scott, "Merrill Lynch Tests Assets Management For Small Investors", Wall Street Journal, p. 1, Mar. 12, 1984.

*Primary Examiner*—Emanuel Todd Voeltz
*Assistant Examiner*—George D. Morgan
*Attorney, Agent, or Firm*—Robert M. Downey, P.A.

[57] ABSTRACT

A data processing system and method are provided for allocating all charged transactions, accrued interest attributable to each charged transaction, and payments made by respective credit cardholders, to sub-accounts specifically designated by the cardholder. In particular, at the point of purchase, the cardholder specifies one or more designated sub-accounts to which the charge is to be allocated. The data processing system allocates to each designated sub-account all charges specified, as well as all interest charges that accrue as to each designated sub-account to which the interest charges are attributable. As each periodic payment is made by the cardholder, the cardholder has the capability of specifying the designated sub-account or portion thereof which is being paid. The data processing system allocates each payment to the designated sub-account(s) specified by the cardholder and calculates interest charges allocable to each designated sub-account as adjusted by each payment by the cardholder. The data processing system also tracks and calculates all charges and payments on a cumulative basis (i.e., without regard to the sub-accounts) so that monthly or other period billing statements will reflect cumulative charges for the billing period, and prior outstanding account balances and credits. The system also calculates and generates a breakdown of new charges to each sub-account for the billing period, as well as cumulative outstanding balances on each sub-account.

14 Claims, 6 Drawing Sheets

|  | $14.00 |
|---|---|
| PROD. CODE | TOTAL AMOUNT |

*Notice to Buyer: Do not sign this agreement before you read it or if it contains any blank spaces. You are entitled to a completely filled-in copy of this agreement at the time you sign it. See back for add'l terms & product codes.

Honor All Address ..................................................
..................................................

Dealer

605691

2— SA 401

Transaction Date
10-6-98

Invoice No.

| Initials | Odometer | Prod/Quantity | | Price | Amount | |
|---|---|---|---|---|---|---|
|  |  | Fuel | 9.4 |  | 10 | .26 |
|  | Vehicle No. |  |  |  |  |  |
| Auth. Code |  | Oil |  | 3.00 | 3 | .00 |
|  | License No. | Other/Qty |  |  |  |  |
| Sue Sh Sign Here |  |  |  | Tax |  | .74 |
|  |  |  |  | Total | 14 | .00 |

Fed, State and Local Taxes, when applicable, are included in price unless separately stated.

Customer Copy 36-090-ad (5-93)

CREDIT CARD STATEMENT

Prepared for John, Sue and Jack Law Firm
Closing Date 10/31/98
Acct. #6241-448-31076

| Previous Card Balance | Card Payments | New Card Charges | Interest | New Card Balance |
|---|---|---|---|---|
| 14,978.51 | −2,944.51 | 2,454.00 | 229.16 | 14,717.16 |

CARD TRANSACTIONS FOR JOHN — 7A

| | | |
|---|---|---|
| October 1, 1998—XYZ Airlines | SA 010 | 284.00 |
| October 3, 1998—Office Supply Superstore | SA 401 | 101.29 |
| October 16, 1998—Manuel's Bar & Grill | SA 210 | 64.40 |
| October 25, 1998—Finely & Jacobs, Court Reporters | SA 010 | 625.00 |
| Activity for John | New Charges | 1,074.69 |

CARD TRANSACTIONS FOR SUE — 7B

| | | |
|---|---|---|
| October 2, 1998—Circuit Court of Dade County Filing Fee | SA 210 | 128.00 |
| October 6, 1998—ABC Gas | SA 401 | 14.00 |
| October 19, 1998—Genesis Restaurant | SA 010 | 74.00 |
| October 30, 1998—Office Supply Superstore | SA 010 | 288.00 |
| Activity for Sue | New Charges | 504.00 |

CARD TRANSACTIONS FOR JACK — 7C

| | | |
|---|---|---|
| October 15, 1998—Host Airlines | SA 210 | 422.00 |
| October 18, 1998—Knoxville Hotel | SA 210 | 216.00 |
| October 30, 1998—Avis Car Rental | SA 401 | 237.31 |
| Activity for Jack | New Charges | 875.31 |

SUB-ACCOUNT 010 — 4

| | |
|---|---:|
| October 1, 1998—American Airlines (John) | 284.00 |
| October 19, 1998—Genesis Restaurant (Sue) | 74.00 |
| October 25, 1998—Finely & Jacobs Court Reporters (john) | 625.00 |
| October 30, 1998—Office Supply Superstore (Sue) | <u>288.00</u> |
| Total New Charges Sub-Account 010 | 10 — 1,271.00 |
| Previous Card Balance Sub-Account 010 | 11 — 12,034.00 |
| Interest on Sub-Account 010 | 9 — 229.16 |
| Card Payments/Credits on Sub-Account 010 | <u>11A — -0-</u> |
| New Balance on Sub-Account 010 | 13,534.16 |

SUB-ACCOUNT 210 — 5

| | |
|---|---:|
| October 2, 1998—Circuit Court of Dade County Filing Fee (Sue) | 128.00 |
| October 15, 1998—Host Airlines (Jack) | 422.00 |
| October 16, 1998—Manuel's Bar & Grill (John) | 64.40 |
| October 18, 1998—Knoxville Hotel (Jack) | <u>216.00</u> |
| Total New Charges Sub-Account 210 | 14 — 830.40 |
| Previous Card Balance Sub-Account 210 | 12 — 1,928.16 |
| Interest on Sub-Account 210 | -0- |
| Card Payments/Credits on Sub-Account 210 | <u>1,928.16</u> |
| New Balance on Sub-Account 210 | 15 — 830.40 |

SUB-ACCOUNT 401 — 6

| | |
|---|---:|
| October 3, 1998—Office Supply Superstore (John) | 101.29 |
| October 6, 1998—ABC Gas (Sue) | 8 — 14.00 |
| October 30, 1998—Avis Car Rental (Jack) | <u>237.31</u> |
| Total New Charges Sub-Account 401 | 16 — 352.60 |
| Previous Card Balance Sub-Account 401 | 1,016.35 |
| Interest on Sub-Account 401 | 13 — -0- |
| Card Payments/Credits on Sub-Account 401 | <u>1,016.35</u> |
| New Balance on Sub-Account 401 | 17 — 352.60 |

FIG. 2-B

PAYMENT COUPON

Account Number: 6241-448-31076
        Closing Date: 10/31/98

John, Sue & Jack Law Firm

YOUR TOTAL BALANCE              $14,717.16

Minimum Payment Due              600.00

Please Enter Amount of Payment Enclosed    | 1,183.00 |

ALLOCATION OF PAYMENT TO SUB-ACCOUNTS — 18A

Please allocate our enclosed payment to the sub-accounts as follows:

$-0- to SA 010; Please apply enclosed payment of $1,183 to pay in full SA 210 and SA 401.

CREDIT CARD BILLING SYSTEM FOR IDENTIFYING EXPENDITURES ON A CREDIT CARD ACCOUNT

BACKGROUND OF THE INVENTION

1. Field of the Invention

The present invention relates to a credit card billing system and method, and more particularly, to a system and method for allocating all charges made by a credit cardholder, interest attributable to each charge and payments made by the cardholder, to sub-accounts specifically designated by the cardholder.

2. Description of the Related Art

At the current time, all issuers of credit cards, such as Visa, Mastercard and American Express, render periodic billing statements to their cardholders which list all charges and accrued interest. Where multiple cards are issued under one account, such as a business organization having cards for multiple employees or a family with several family members using an account, some credit card issuers list the charges and also reflect which person using the account incurred each charge. However, presently known credit card billing systems and methods do not provide a means for credit card users to have charged transactions, accrued interest on each charged transaction and payments, allocated to one or more sub-accounts specifically designated by the credit card user.

It is commonly necessary for a credit card account holder to account for and allocate each charge for various tax or business purposes, such as:

(i) Tax deductible versus non-deductible charges;
(ii) Tax deductible versus non-deductible interest expense;
(iii) Charges, including interest, which may be billed (i.e., passed thru) to a customer or client of a cardholder; and
(iv) General or specific cost control accounting.

Under the present billing system utilized by all credit card issuers, in order to account for each individual charge, the cardholder must examine each charge and determine from the person incurring the charge, which may be an employee, family member, etc. the nature and purpose of the charge. This presents a substantial accounting undertaking which is exacerbated where an organization or family has numerous persons incurring charges on one account.

Furthermore, when paying a credit card bill, present billing methods do not allow a cardholder to specify a sub-account(s) to which all or a portion of the payment is to be credited, and to thereby leave outstanding balances, with accruing interest charges, in other sub-accounts, in accordance with the tax, business or accounting needs of the cardholder. At the present time, there is no method by which a cardholder can allocate payments so as to control and identify the specific prior charges as to which interest is accruing. This shortcoming may have adverse tax and business consequences for the cardholder. For instance, a tax deduction for the payment of accrued interest expense may be lost or the right to pass the interest charges on to a customer or client of the cardholder may be lost because the interest expense cannot be tied to a particular charge or group of charges. The present invention, therefore, produces a useful, concrete and tangible result because the creation of the sub-accounts results in substantive changes in tax and business consequences to the cardholder which cannot be achieved with any presently existing credit card billing methods or bookkeeping method which may be employed by the cardholder.

The present invention develops a unique method to allow each person incurring credit card charges to designate a specific sub-account to which each charge and interest attributable thereto shall be allocated by the credit card issuer to be reflected on each billing statement to the cardholder. The cardholder may thereby obtain the information provided by the separate sub-account listings on each credit card statement to satisfy and resolve the credit card holders need to account for various categories of charges, such as:

(i) Tax deductible versus non-deductible charges;
(ii) Tax deductible versus non-deductible interest expense;
(iii) Charges, including interest, which may be billed (i.e., passed thru) to a customer or client of a cardholder; and
(iv) General or specific cost control accounting.

In addition, this unique method will also allow the credit card holder to specify each sub-account to which each monthly or other periodic payment by the cardholder is to be allocated, thereby determining which specific charges are to remain outstanding and accrue interest charges.

SUMMARY OF THE INVENTION

The present invention provides a data processing system and method for allocating transaction charges using credit cards, debit cards, check cards and the like (referred to hereinafter as "credit cards") incurred by a credit cardholder, and accrued interest attributable thereto, to sub-accounts specified at the point of purchase by the person incurring the charge. The present invention also provides a data processing system and method for allocating payments by a credit cardholder of principal and/or accrued interest to the sub-accounts designated by the cardholder. The data processing system tracks all charges and interest attributable thereto, as well as payments, in specific sub-accounts to be designated respectively, by the person incurring the charge or making the payments, so that aggregate charges, interest accruals and payments may be determined for each sub-account for any accounting purpose desired by the credit card holder. The present invention, therefore, produces a useful, concrete and tangible result because the creation of the sub-accounts may also result in substantive changes in tax and business consequences to the cardholder which cannot be achieved with any presently existing credit card billing methods or bookkeeping method which may be employed by the cardholder. The present invention also results in efficiencies and cost savings by facilitating identification by the credit card user at the point of purchase of the sub-account to which the charge is to be allocated.

BRIEF DESCRIPTION OF THE DRAWINGS

For a fuller understanding of the nature of the present invention, reference should be had to the following detailed description taken in conjunction with the accompanying drawings in which:

FIG. 1 is a representation of a point of purchase credit card slip with the designation of a specific sub-account to which the fuel and oil charges thereon are to be allocated. For purpose of illustration, "SA 401" is used to denote the sub-account to which the charge is to be allocated by the credit card issuer. For illustration purposes, this charge flows into and is reflected on the credit card statement at FIG. 2.

FIG. 2 is an example of a monthly statement issued by a credit card issuer where the charges have been allocated to sub-accounts designated by the person(s) incurring the charge(s) at the point of purchase and where there are three different individuals, "John, Sue and Jack," incurring charges on the account. FIG. 2 also illustrates how the cardholder may elect to allow interest to accrue on one or more classifications of charges (i.e., sub-accounts) and not as to other charges.

FIG. 3 is an example of a payment made by a credit card holder designating the specific sub-accounts to which the payment is to be allocated and corresponds to the credit card statement at FIG. 2.

Like reference numerals refer to like parts throughout the several views of the drawings.

DETAILED DESCRIPTION OF THE PREFERRED EMBODIMENT

Figure 4:
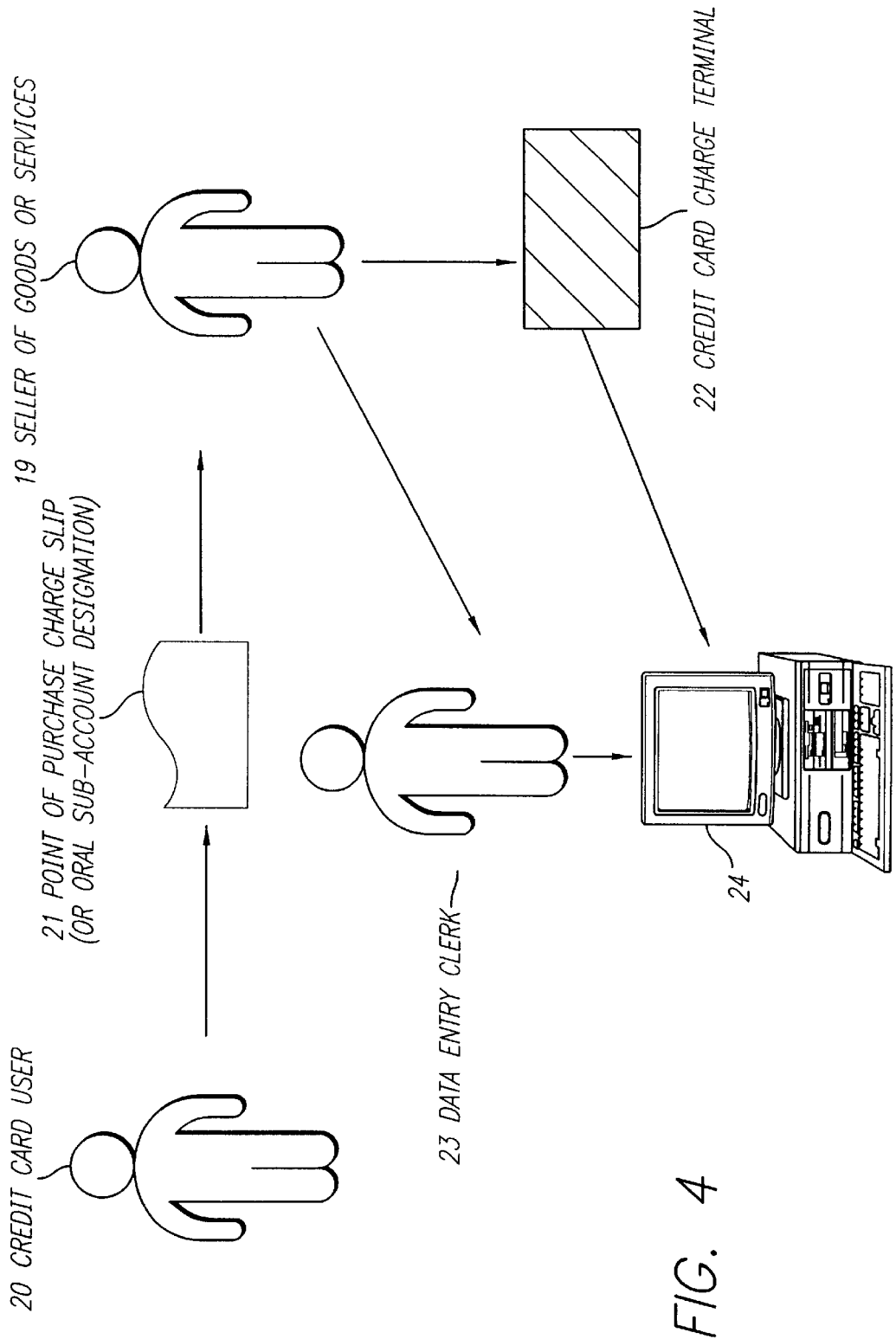
FIG. 4 depicts an overview of the flow of information from the point of purchase in the credit card billing system to allocate all charges and interest attributable to charges to sub-accounts specifically designated by the cardholder.

The present invention is directed to a data processing system and method for use in a credit card billing system to allocate all charges and interest attributable to charges, as well as payments, to sub-accounts specifically designated by the cardholder. FIG. 1 depicts an example of a credit card charge slip 1 on which the person incurring the charge ("Sue") has designed "SA 401," as the sub-account, indicated by reference numeral 2, to which the credit card issuer is to allocate this $14.00 charge, as indicated by reference numeral 3.

FIG. 2 is an example of a monthly statement issued by a credit card issuer, wherein the charges made by cardholders on the account have been allocated to three separate sub-accounts, indicated by reference numerals 4, 5 and 6. These sub-accounts are designated by the person(s) incurring the charge(s) at the point of purchase. More specifically, FIG. 2 illustrates a monthly statement for a law firm's credit card account on which three individuals are authorized to charge purchases, i.e., John, Sue and Jack. FIG. 2 illustrates how the $14.00 charge shown on the charge slip 1 in FIG. 1, made by "Sue," is reflected in the general listing of charges, indicated by reference numeral 7. This charge by Sue is further allocated to sub-account 401, indicated by reference numeral 8, along with all charges to sub-account 401, as designated by the three authorized credit card users, reference numerals 7A, 7B and 7C (John, Sue and Jack).

FIG. 2 also illustrates that interest charges on the credit card are allocated to the specific sub-accounts to which they are attributable. Thus, sub-account 010, indicated by reference numeral 4, reflects an interest charge for the billing period of $229.16, indicated by reference numeral 9, which is based upon the new charges, indicated by reference numeral 10, for sub-account 010 and the previous outstanding balance, indicated by reference numeral 11, of sub-account 010. As distinguished from sub-account 010, sub-account 210, indicated as reference numeral 5, and sub-account 401, indicated as reference numeral 6, reflect that there are no interest charges for the billing period attributable to charges in those sub-accounts (see reference numerals 12 and 13). This is because the previous outstanding balance of sub-accounts 210 and 401 were paid in full, as indicated at reference numerals 14, 15, 16 and 17.

FIG. 2 also illustrates that the credit card payment for the prior month was allocated by the credit card issuer to specific sub-account(s) as directed by the account holder. Thus, FIG. 2 reflects that the previously outstanding balance of sub-account 210 (see reference numeral 14) was paid in full (as indicated at reference numeral 15) and the previously outstanding balance of sub-account 401 (see reference numeral 16) was paid in full (as indicated at reference numeral 17), while no portion of the prior payment was allocated to the previously outstanding balance of sub-account 010 (see reference numerals 11 and 11A).

For further illustration of the substantive consequences of this ability to allocate charge transactions, interest accruals and payments to specific sub-accounts, assume the following: Sub-account 010 represents the law firm's costs incurred in representing a client, Mike Smith, in a personal injury claim. The law firm's fee agreement provides for Mike Smith to pay all out-of-pocket costs incurred by the firm at the time of any recovery for him. When Mike Smith's case is concluded, as a result of the present invention providing for sub-accounts, the law firm may bill Mr. Smith for all interest accrued on his sub-account as an out-of-pocket cost.

If a credit card, using any billing method in use today, were utilized by the law firm, there would be no way for the law firm to establish the interest charges directly attributable to charges incurred for Mr. Smith's case, and if interest on the credit card account were to be passed through at all, some pro-ration would be required between the charges incurred for Mr. Smith and all other charges and only a portion of the total interest charges could reasonably be attributable to Mr. Smith's case and not 100%, as accomplished by the present invention. Therefore, this is one illustration of how the present invention provides a useful, concrete and tangible result which cannot be achieved with any presently existing credit card billing methods or any bookkeeping method which may be employed by the cardholder.

FIG. 3 is an example of a Payment Coupon 18 to be used by the credit cardholder to designate the sub-accounts to which each monthly or other periodic payment is to be allocated. FIG. 3 demonstrates that a payment is being made which is to pay the full balance of sub-accounts 210 and 401 (i.e., SA 210 and 401), while no portion of sub-account 010 is being paid, as set forth under the allocation instructions, as indicated at reference numeral 18A. This allocation will result in continued accrual of interest charges with respect to the balance in sub-account 010, whereas in the absence of the ability to make an allocation among sub-accounts, interest would for all purposes be deemed to accrue as to the entire unpaid, unallocated balance due on the account. The present invention creates the advantage of allowing the credit card account holder the ability to select specific charges which are to remain outstanding, thereby having interest accrue only on the selected charges. Such a selection is also important, inter alia for income tax purposes, where interest on certain expenses may be non-deductible and also for business purposes where interest charges may be passed on to a customer or client for whose benefit the charges were incurred as discussed above.

Another advantage of the invention is that the system of sub-accounts performs an important record keeping function in allowing the credit card user to track and account for all credit card charges by category. The categories of charges are selected by the credit cardholder and may serve tax, business or other record keeping purposes, such as:

(i) Tax deductible versus non-deductible charges;
(ii) Tax deductible versus non-deductible interest expense;

(iii) Charges, including interest, which may be billed (i.e., passed thru) to a customer or client of a cardholder; and (iv) General or specific cost control accounting.

The ability of the person incurring the charge to allocate the charge at the point of purchase to a particular sub-account, wherein there are numerous persons authorized to use one credit card account, presents a further improvement over present credit card billing methods. This ameliorates the need to have follow-up communications with each user of the credit card to determine the purpose and nature of each expenditure which must ordinarily be done when a credit card statement in use today is received which does not have any method for establishing sub-accounts.

FIG. 4 presents an overview of the information flow that occurs in the credit card billing system to allocate all charges and interest attributable to charges, to sub-accounts specifically designated by the cardholder. A seller of goods or services 19 is instructed by the credit card user 20 at the point of purchase to electronically enter a sub-account identification number or other code at the point or purchase. The selected one or more sub-account numbers are electronically transmitted to the credit card issuer by charge terminal 22 or, alternatively, the credit card user writes a sub-account number or other code on the point of purchase charge slip 21. The seller of goods or services at the point of sale may receive an on-line electronic prompt upon a credit card charge terminal 22 to request any sub-account number from the user of the credit card, said prompt being programmed in to the card issuer's computer system 24. Where the information as to a charge has not been electronically transmitted to the credit card issuer, including appropriate sub-account information, then each charge slip is transmitted through usual and customary channels back to the credit card issuer. In that case, the data entry clerk 23 at the credit card issuer enters the charge information obtained from the point of purchase charge slip into a computer 24 programmed with appropriate software. Where the charge information is entered into an on-line charge terminal 22 at the point of purchase, the charge information is electronically transmitted to the credit card issuer's computer system 24 directly from the point of purchase credit card charge terminal 22, including the sub-account information, so that manual entry of same by a data clerk is not necessary. The computer 24 into which charge and sub-account information is entered by the data entry clerk 23 and to which charge information may also be electronically transferred directly from the point of purchase credit card charge terminal 22 is capable of producing printed output and storing data. An integrated software package allocates all charges and interest accruals for each credit card account in accordance with the sub-accounts specified at the point of purchase, as well as in general account (non-sub-account) form.

Figure 5:
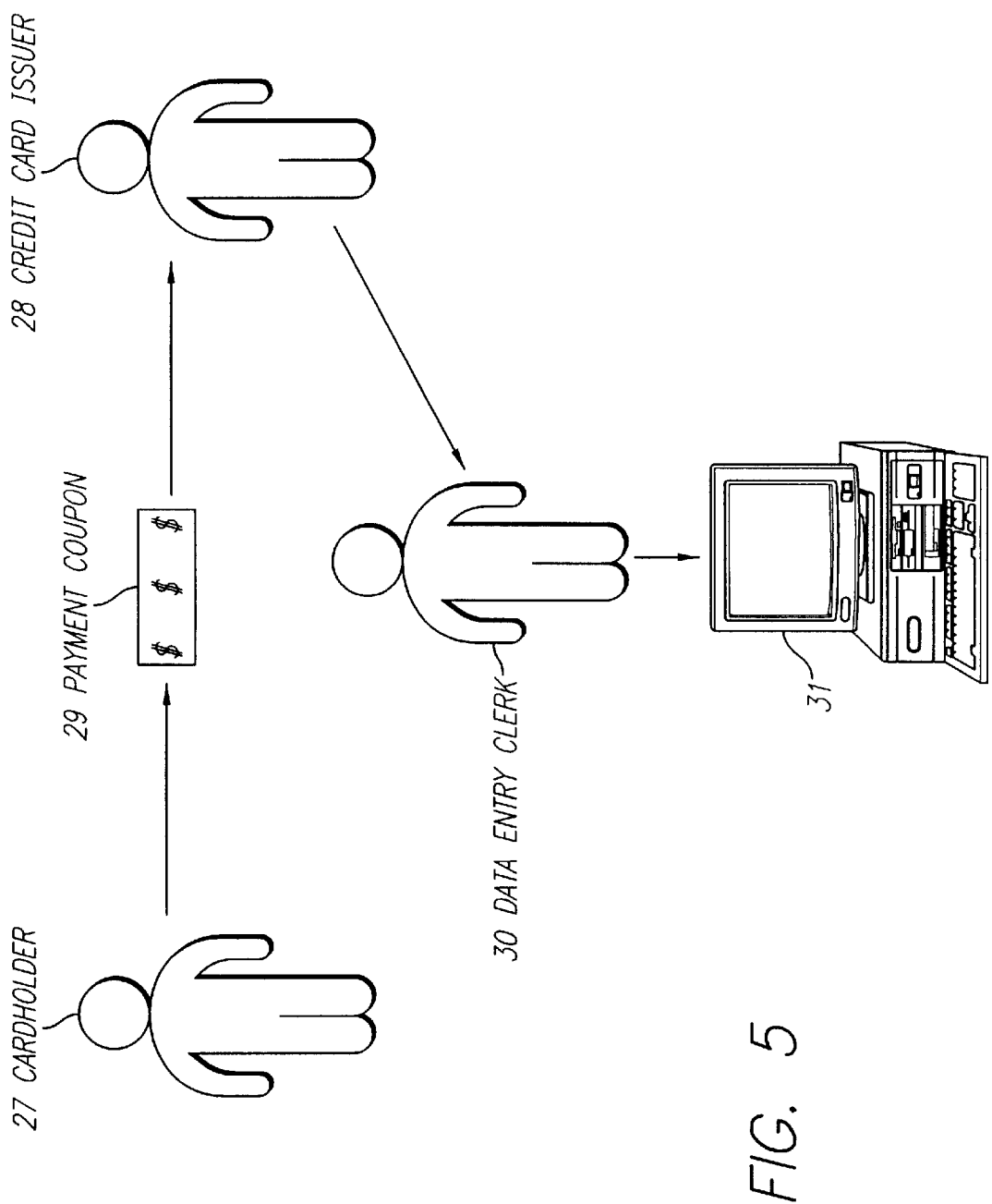
FIG. 5 depicts an overview of the flow of information from the cardholder in the credit card billing system to allocate all payments by the cardholder to the sub-accounts specifically designated by the cardholder.

FIG. 5 presents an overview of the information flow that occurs in the credit card billing system to allocate all payments to sub-account specifically designated by the paying cardholder. A cardholder 27 sends payment to the credit card issuer 28 accompanied by a specially designed payment coupon 29 which designates the particular sub-account(s) to be paid. Payment is processed by the data entry clerk 30 who enters the payment information from the payment coupon 29 into a computer 31 capable of producing printed output and storing data. An integrated software package allocates the payment to the sub-accounts as well as the overall account balances, as specified by the cardholder's instruction on the payment coupon 29.

The computer system and software is configured so that cumulative charges, interest accruals and payment information may be calculated and printed on an annual or any other time period basis in addition to regular billing cycles.

While the instant invention has been shown and described in what is considered to be a preferred and practical embodiment thereof, it is recognized that departures may be made within the spirit and scope of the present invention which, therefore, should not be limited, except as set forth within the following claims as interpreted under the doctrine of equivalents.

What is claimed is:

1. A data processing system for managing and producing statements for a credit card account of a cardholder, comprising:

first means provided at points of purchase for entering charge data including data identifying one or more sub-accounts, designated by the cardholder, to which charged transactions are to be allocated;

second means for processing data for said credit card account including each of said designated sub-accounts;

third means for storing said data on a storage medium;

fourth means for processing said data, said processing including:
(i) allocating said charged transactions to said one or more designated sub-accounts; and
(ii) allocating interest accruals among said one or more designated sub-accounts to which said interest accruals are attributable;

fifth means for processing said data, said processing including allocating payments made by the cardholder to said one or more designated sub-accounts; and sixth means for processing periodic statements, said processing including:
(i) calculating said charged transactions, said interest accruals, and said payments made by the cardholder;
(ii) allocating said calculated charged transactions, said calculated interest accruals and said calculated payments to said one or more designated sub-accounts; and
(iii) generating the periodic statements including a report showing said calculated charged transactions, said calculated interest accruals, and said calculated payments on both a sub-account basis and a cumulative basis for the credit card account.

2. A data processing system as recited in claim 1 wherein said first means comprises:

a charge slip having means thereon for entering said designated one or more sub-accounts.

3. A data processing system as recited in claim 1 wherein said first means comprises:

means for electronically entering said designated one or more sub-accounts.

4. A data processing system as recited in claim 1 wherein said sixth means further comprises:

means for identifying said charge data including said charged transactions and said payments according to specified time periods; and means for retrieving said charge data according to said specified time periods.

5. A data processing system as recited in claim 1 wherein said sixth means further comprises:

means for calculating a total of said charged transactions, said interest accruals and credits for the entire credit card account on a cumulative basis.

6. A data processing system as recited in claim 5 wherein said sixth means further comprises:

means for calculating a total of said charged transactions, said interest accruals and said credits for each of said one or more designated sub-accounts over a specified period.

7. A data processing system as recited in claim 6 wherein said second means further comprises:

means for retrieving from said storage medium said data for each of said one or more designated sub-accounts;

means for correcting and updating said data for each of said one or more designated sub-accounts;

means for inputting and storing on said storage medium data regarding increases or decreases in said credit card account data and said data for each of said one or more designated sub-accounts;

means for retrieving said data from said storage medium including said credit card account data and data for each of said one or more designated sub-accounts, said means for retrieving being structured to permit retrieval of said data according to specified billing periods, total charges, and credits for said credit card account and for each of said one or more designated sub-accounts;

means for calculating and processing said data on a daily basis to obtain aggregate year-end reports showing a total of said charged transactions and said credits for said credit card account and for each of said one or more designated sub-accounts; and means for storing the data regarding said aggregate year-end report on said storage medium.

8. A method for managing and producing statements for a credit card account of a cardholder, said method comprising the steps of:

designating, at points of purchase, one or more expenditure groupings on a single credit card account to which expenditures made at the points of purchase are to be allocated in accordance with the accounting needs of the cardholder;

transmitting data, including said expenditures and each of said designated expenditure groupings, from the points of purchase to a processing location;

processing said data, including said expenditures, for said credit card account including each of said designated expenditure groupings;

storing said data on a storage medium;

processing said data including the further steps of:
(i) allocating said expenditures to said one or more designated expenditure groupings;
(ii) allocating interest accruals among said one or more designated expenditure groupings to which said interest accruals are attributable;

processing said data including allocating payments made by the cardholder to said one or more designated expenditure groupings; and processing periodic statements including the further steps of:
(i) calculating said expenditures, said interest accruals, and said payments made by the cardholder;
(ii) allocating said calculated expenditures, said calculated interest accruals, and said calculated payments to said one or more designated expenditure groupings; and (iii) generating the periodic statements including providing a report showing said calculated expenditures, said calculated interest accruals, and said calculated payments on both an expenditure grouping basis and a cumulative basis for the credit card account.

9. The method as recited in claim 8 wherein said step of designating further includes the step of:

identifying said one or more expenditure groupings on a charge slip.

10. The method as recited in claim 8 wherein said step of designating further includes the step of:

electronically entering data identifying said one or more expenditure groupings.

11. The method as recited in claim 8 further including the steps of:

identifying said data including said expenditures and said payments according to specified time periods; and retrieving said data according to said specified time periods.

12. The method as recited in claim 8 wherein said step of processing periodic statements further includes the step of:

calculating a total of said expenditures, said interest accruals, and credits for the entire credit card account on a cumulative basis.

13. The method as recited in claim 12 wherein said step of processing periodic statements further includes the step of:

calculating a total of said expenditures, said interest accruals, and said credits for each of said one or more designated expenditure groupings over a specified period.

14. The method as recited in claim 13 wherein said step of processing data for said credit card account includes the further steps of:

retrieving from said storage medium said data for each of said one or more designated expenditure groupings;

correcting and updating said data for each of said one or more designated expenditure groupings;

inputting and storing on said storage medium data regarding increases or decreases in said credit card account data and said data for each of said one or more designated expenditure groupings;

retrieving said data from said storage medium including said credit card account data and data for each of said one or more designated expenditure groupings, said step of retrieving further including retrieving said data according to specified billing periods, total charges, and credits for said credit card account and for each of said one more designated expenditure groupings;

calculating and processing said data on a daily basis to obtain aggregate year-end reports showing a total of said expenditures and said credits for said credit card account and for each of said one or more designated expenditure groupings; and storing the data regarding said aggregate year-end report on said storage medium.

* * * * *